United States Patent [19]

Harada et al.

[11] Patent Number: 4,991,931
[45] Date of Patent: Feb. 12, 1991

[54] METHOD OF DRIVING OPTICAL WAVELENGTH CONVERTER MODULE

[75] Inventors: Akinori Harada; Yoji Okazaki; Hiroshi Sunagawa, all of Kanagawa, Japan

[73] Assignee: Fuji Photo Film Co., Ltd., Kanagawa, Japan

[21] Appl. No.: 470,500

[22] Filed: Jan. 26, 1990

[30] Foreign Application Priority Data

Jan. 31, 1989 [JP] Japan ................................. 1-22337

[51] Int. Cl.$^5$ ............................. G02B 6/02; H03F 7/00
[52] U.S. Cl. ................................... 350/96.29; 307/425
[58] Field of Search ............... 350/96.10, 96.15, 96.19, 350/96.29, 96.12–96.14; 307/425–430

[56] References Cited

U.S. PATENT DOCUMENTS

| | | | |
|---|---|---|---|
| 4,820,011 | 4/1989 | Umegaki et al. | 350/96.19 |
| 4,838,638 | 6/1989 | Kamiyama et al. | 350/96.19 |
| 4,909,596 | 3/1990 | Okazaki et al. | 350/96.29 |
| 4,919,511 | 4/1990 | Ohsawa | 350/96.29 |

Primary Examiner—Akm Ullah
Attorney, Agent, or Firm—Sughrue, Mion, Zinn, Macpeak & Seas

FOREIGN PATENT DOCUMENTS 62-210432  9/1987  Japan .

[57] ABSTRACT

An optical wavelength converter module includes an optical wavelength converter device having a cladding and a waveguide which is disposed in the cladding and has a higher refractive index than the cladding, at least one of the cladding and the waveguide being made of a nonlinear optical material, whereby the wavelength of a fundamental which is propagating in the waveguide is converted. The optical wavelength converter module also includes a semiconductor laser for emitting a laser beam which is introduced as the fundamental into the waveguide. The semiconductor laser is driven with a pulsed drive current. The duration of the drive current pulses is made short enough to enable the semiconductor laser to produce a higher peak output power than when it is continuously driven, and it is made longer then a duration which falls within the range of pulse durations wherein the input coupling efficiency decreases as the pulse duration decreases and at which the wavelength conversion efficiency is equal to that which is achieved when the semiconductor laser is continuously driven.

8 Claims, 2 Drawing Sheets

METHOD OF DRIVING OPTICAL WAVELENGTH CONVERTER MODULE

BACKGROUND OF THE INVENTION

1. Field of the Invention

The present invention relates to a method of driving an optical wavelength converter module comprising a semiconductor laser which emits a laser beam as a fundamental wave and an optical wavelength converter device in the form of an optical waveguide which converts the wavelength of the laser beam.

2. Description of the Prior Art

Various attempts have heretofore been made to convert the fundamental of a laser beam into its second harmonic, e.g., to shorten the wavelength of a laser beam, using nonlinear optical material. One well known example of an optical wavelength converter device for effecting such laser wavelength conversion is a bulk-crystal-type converter device as disclosed, for example, in *Introduction to Optical Electronics*, pages 200-204, written by A. Yariv and translated by Kunio Tada and Takeshi Kamiya (published by Maruzen K.K.). This optical wavelength converter device relies upon the birefringence of a crystal in order to meet phase matching conditions. Therefore, any material which does not exhibit birefringence or exhibits only small birefringence, even if it has high nonlinearity, cannot be employed.

To solve the above problem, there has been proposed a fiber-type optical wavelength converter device. An optical wavelength converter device of this type is in the form of an optical fiber comprising a core made of a nonlinear optical material and surrounded by a cladding. One example of such an optical fiber is shown in vol. 3, No. 2, pages 28-32, of the Bulletin of the Microoptics Research Group of a gathering of the Japanese Applied Physics Society. Recently, much effort has been directed to the study of a fiber-type optical wavelength converter device since it can achieve gain phase matching between a fundamental and its second harmonic.

There are also known optical wavelength converter devices comprising a two-dimensional optical waveguide which is made of a nonlinear optical material and sandwiched between two substrates that serve as a cladding, as disclosed in U.S. Pat. No. 4,820,011, for example. Another known optical waveguide converter device comprises a three-dimensional optical waveguide which is made of a nonlinear optical material and embedded in a substrate of glass. The three-dimensional optical waveguide emits second harmonics into the substrate. These known optical-waveguide-type optical converter devices also offer the same advantage as that of the fiber-type optical waveguide converter device.

U.S. patent application Ser. No. 328,266 discloses in detail the generation of the sum of and the difference between the frequencies of two fundamentals with a fiber-type optical waveguide converter device. The generation of such sum and differential frequencies is also disclosed in detail in U.S. patent application Ser. No. 328,266. It is also known in the art that third harmonics can be generated using a nonlinear optical material having nonlinearity of the third order.

The waveguide of each of fiber- and optical-waveguide-type optical wavelength converter device is made of a nonlinear optical material. However, only the cladding or both the waveguide and the cladding may be made of a nonlinear optical material. Since part of a guided wave which is propagating through the waveguide enters as an evanescent wave into the cladding, the wavelength of the evanescent wave can be converted if the cladding is made of a nonlinear optical material.

An optical-waveguide-type optical wavelength converter device is often combined with a semiconductor laser which emits a laser beam as a fundamental, and the combination is used as an optical waveguide converter module. The efficiency with which a wavelength is converted by an optical wavelength converter device is proportional to the square of the intensity of the applied fundamental (more precisely, the intensity of the fundamental which travels through a nonlinear optical material) which is used for the generation of a second harmonic, to the cube of the intensity of the fundamental which is used for the generation of a third harmonic, and to the product of the intensities of two fundamentals which are used for the generation of sum and differential frequencies. In order for the optical wavelength converter module to produce a wavelength-converted wave of high intensity, therefore, it is highly effective to increase the output power of the semiconductor laser.

One known method of increasing the output power of a semiconductor laser is to drive the semiconductor laser with pulses. When the semiconductor laser is driven with pulses and the duration of each pulse is shorter than a certain time, the semiconductor laser is less liable to become thermally saturated, and can produce a peak output power higher than when it is continuously driven by a continuous drive signal.

If the semiconductor laser of the above optical wavelength converter module is driven with a pulsed drive current, then it is theoretically expected that the optical wavelength converter module will generate a wavelength-converted wave of higher intensity than when the semiconductor laser is continuously driven. When the semiconductor laser is actually driven with a pulsed drive current, the wavelength conversion efficiency of the optical wavelength converter module does become higher in certain instances than when it is continuously driven, but it also becomes lower in other instances.

SUMMARY OF THE INVENTION

It is an object of the present invention to provide a method of driving an optical wavelength converter module such that the efficiency with which a wavelength is converted thereby will be maintained at a higher level than when it is continuously driven.

According to the present invention, there is provided a method of driving an optical wavelength converter module including an optical wavelength converter device having a cladding and a waveguide which is disposed in the cladding and has a higher refractive index than the cladding, at least one of the cladding and the waveguide being made of a nonlinear optical material, whereby the wavelength of a fundamental which is propagating in the waveguide is converted, the optical wavelength converter module also including a semiconductor laser for emitting a laser beam which is introduced as the fundamental into the waveguide, the method comprising the steps of driving the semiconductor laser with a pulsed drive current, and making the duration of the drive current pulses short enough to enable the semiconductor laser to produce a higher peak output power than when the semiconductor laser is continuously driven, and making it longer than a duration which falls within the range of pulse durations wherein the input coupling efficiency decreases as the pulse duration decreases and at which the wavelength conversion efficiency is equal to that which is achieved when the semiconductor laser is continuously driven.

The inventor has found that when a semiconductor laser is driven with a pulsed drive current, the semiconductor laser produces a higher peak output power as the duration of the drive current pulses is reduced, and the input coupling efficiency is progressively reduced as the duration of the drive current pulses becomes smaller than a certain value. This appears to be caused by the fact that if the pulse duration is greatly reduced, the oscillation mode of the semiconductor laser switches from a basic mode to a higher-order mode, thus making the intensity distribution of the laser beam widely different from the Gaussian distribution, so that the input coupling efficiency is lowered. The above problem occurs either when the laser beam emitted from the semiconductor laser is applied to the waveguide of the optical waveguide converter device through an end face thereof or when the laser beam emitted from the semiconductor laser is applied to a two-dimensional waveguide after it is diffracted by a grating coupler on the surface of a substrate of the waveguide.

The reduction in the wavelength conversion efficiency which occurs when the semiconductor laser is driven with a pulsed drive current is believed to be caused by the reduction in the input coupling efficiency. With the duration of the drive current pulses being selected according to the present invention, the peak output power of the semiconductor laser will increase because of the reduced pulse duration, while at the same time the reduction in the input coupling efficiency due to an excessively short pulse duration will be avoided. The wavelength conversion efficiency of the optical wavelength converter device is higher than when the semiconductor laser is continuously driven.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
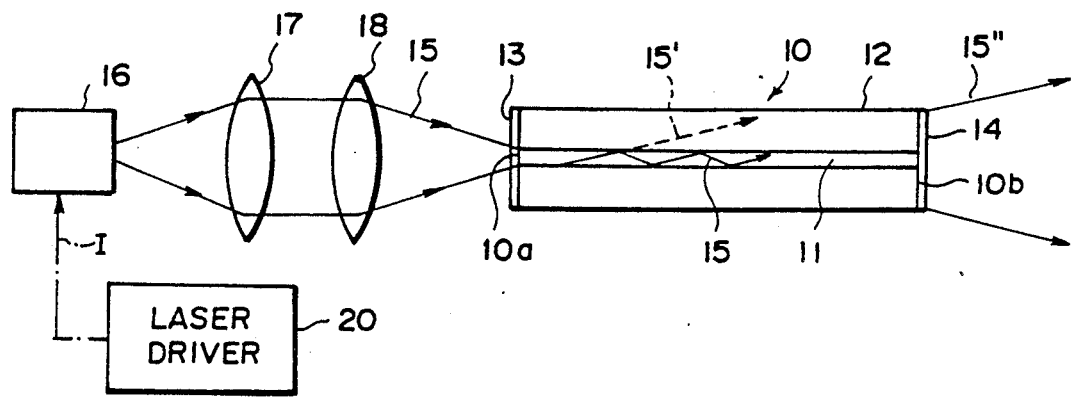
FIG. 1 is a schematic side elevational view of an optical wavelength converter module which is driven by a method according to the present invention.

FIG. 1 shows an optical wavelength converter module which is driven by a method according to the present invention. The optical wavelength converter module comprises a fiber-type optical wavelength converter device 10, for example, and a semiconductor laser 16 for emitting a laser beam 15 that is introduced as a fundamental into the optical wavelength converter device 10.

The optical wavelength converter device 10 comprises an optical fiber including a core 11 made of a nonlinear optical material and filled into a hollow space defined centrally in a cladding 12. The nonlinear optical material of the core 11 is preferable an organic nonlinear optical material which allows the wavelength of a wave to be converted with a high efficiency. In this embodiment, the core 11 is made of 3,5-dimethyl-1-(4-nitrophenyl)pyrazole (hereinafter referred to as "PRA"), as disclosed in Japanese Unexamined Patent Publication No. 62(1987)-210432.

Figure 3:
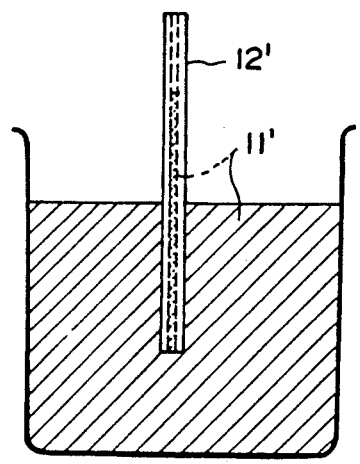
FIG. 3 is a schematic view showing a process for manufacturing the optical wavelength converter device shown in FIG. 2.

A process for manufacturing the optical wavelength converter device 10 will be described below with reference to FIG. 3. It is assumed that the core 11 is made of PRA and the cladding 12 is made of SF56 glass. A hollow glass fiber 12' serves as the cladding 12, the hollow glass fiber 12' having an outside diameter of about 3 mm and the hollow space therein having a diameter of about 2 μm, for example. As shown in FIG. 3, PRA is kept as a molten solution 11' in a furnace, and one end of the glass fiber 12' is immersed in the molten solution 11'. Then, the molten solution 11' of PRA enters the hollow space in the glass fiber 12' due to capillarity. The molten solution 11' is kept at a temperature slightly higher than the melting point (102° C.) of PRA in order to prevent the PRA from being decomposed. Thereafter, the glass fiber 12' is quickly cooled, which causes the PRA in the hollow space to be polycrystallized.

Then, the glass fiber 12' is gradually pulled from the furnace, which is kept at a temperature (e.g., 102.5° C.) higher than the melting point of PRA, into an outer space, which is kept at a temperature lower than that melting point, thereby causing the molten PRA to be monocrystallized continuously at the point where it is progressively withdrawn from the furnace. The core 11 thus prepared is of a highly long monocrystalline form with a uniform crystal orientation. The optical wavelength converter device 10 is therefore made sufficiently long. As is well known in the art, the efficiency with which the wavelength of a wave is converted by an optical wavelength converter device (hereinafter referred to as the "wavelength conversion efficiency") is proportional to the length of the optical wavelength converter device. Therefore, the longer the optical wavelength converter device, the higher the practical value thereof.

Figure 2:
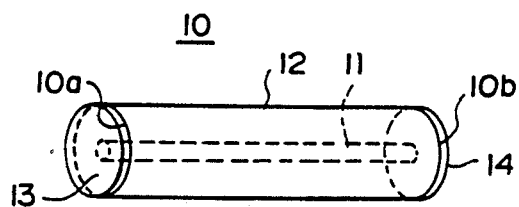
FIG. 2 is a perspective view of the optical wavelength converter module shown in FIG. 1.

After the core 11 is filled into the glass fiber 12', the opposite ends of the glass fiber 12' are cut off at suitable points, and end faces 10a, 10b thereof are coated with resin films 13, 14, respectively, as shown in FIG. 2. The organic substance contained in the nonlinear optical material of the core 11 tends to be sublimated or modified. However, the coated resin films 13, 14 are effective in preventing the organic substance from being sublimated or modified through the end faces 10a, 10b. In this manner, the optical wavelength converter device 10 shown in FIGS. 1 and 2 is produced.

The optical wavelength converter device 10 is used as shown in FIG. 1. More specifically, a laser beam (fundamental) 15, which is emitted as a divergent beam from the semiconductor laser 16 and has a wavelength of 890 nm, is converted by a collimator lens 17 into a parallel beam. The parallel laser beam is then converged by an objective lens 18 and applied to the entrance end face 10a (the end of the core 11) as a small beam spot which has the same diameter (of 2 μm in this embodiment) as that of the core 11. The laser beam 15 now enters the optical wavelength converter device 10. The laser beam or fundamental 15 is then converted by the PRA of the core 11 into its second harmonic 15' whose wavelength is ½ of the wavelength of the fundamental 15. The second harmonic 15' is radiated into the cladding 12 and travels through the device 10 toward the opposite end thereof while the second harmonic 15' is repeatedly and totally reflected by the interface between the outer circumferential surface of the cladding 12 and the surrounding medium (usually air). Phase matching is achieved between a guided mode, in which the fundamental 15 is guided through the core 11, and a radiated mode, in which the second harmonic 15' is radiated into the cladding 12 (so-called "Cherenkov radiation").

A light beam 15" which includes the second harmonic 15' is emitted out of the device 10 from the exit end face 12a thereof. The light beam 15" then goes through a filter (not shown) which passes only the second harmonic 15'.

According to the present invention, a laser driver 20 supplies a pulsed rectangular-wave drive current I to the semiconductor laser 16, which is then driven with drive current pulses. The duration of the drive current pulses is selected to be 1 μs, for example, so that the optical wavelength converter device 10 can achieve a very high wavelength conversion efficiency. The reasons why the very high wavelength conversion efficiency can be achieved will be described below.

Figure 4:
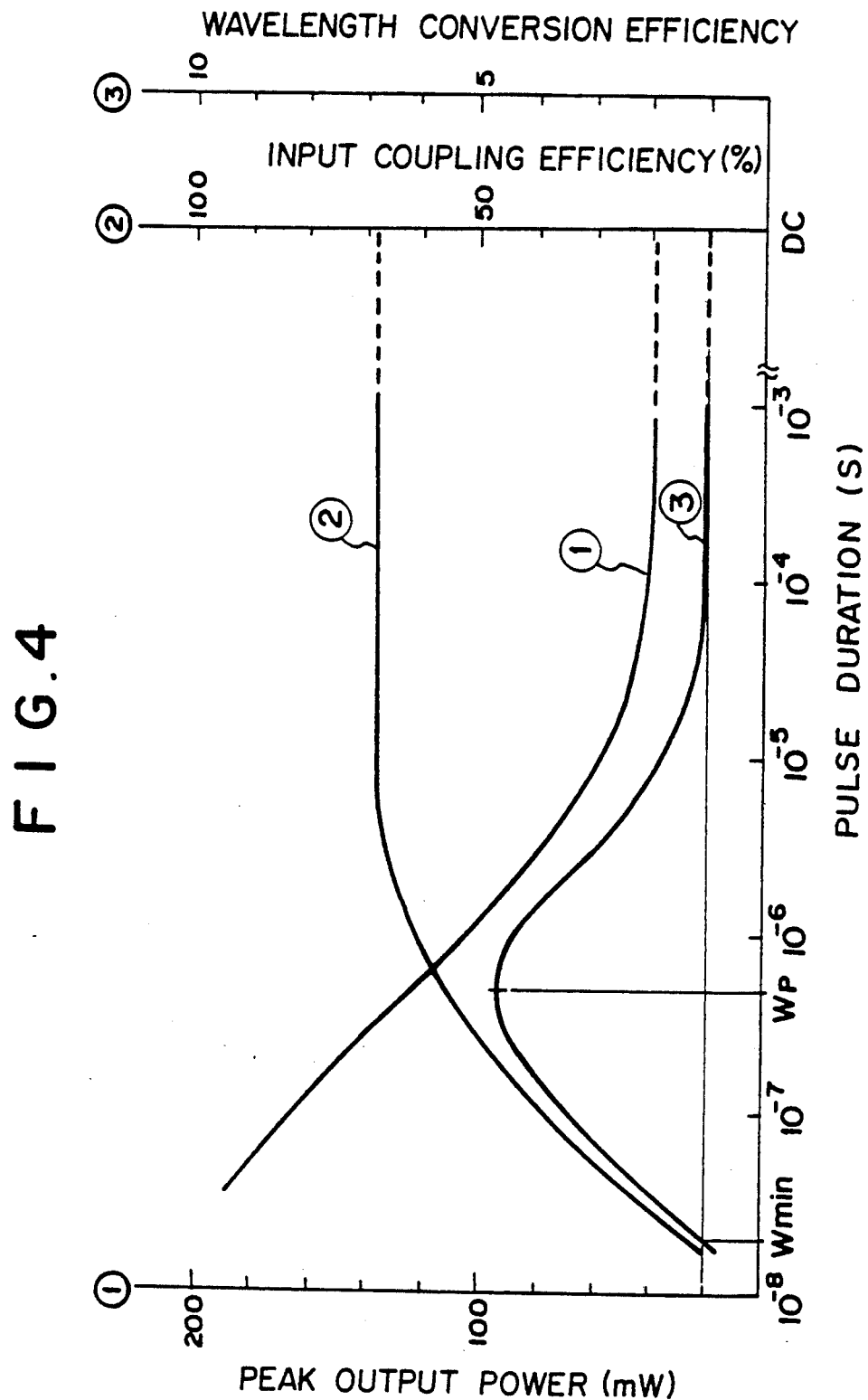
FIG. 4 is a graph showing, by way of example, the relationship between the duration of drive pulses applied to a semiconductor laser, the peak output power of the semiconductor laser, the efficiency with which a laser beam is introduced into an optical wavelength converter device, and the efficiency with which a wavelength is converted by the optical wavelength converter device.

FIG. 4 shows how (1) the peak output power of the semiconductor laser 16, (2) the efficiency with which the laser beam 15 is introduced into the core 11 (hereinafter referred to as the "input coupling efficiency"), and (3) the wavelength conversion efficiency vary when the duty ratio of the semiconductor laser 16 is 50% and the pulse duration of the laser beam 15 is changed in the optical wavelength converter module shown in FIG. 1. The values of the wavelength conversion efficiency on the graduated scale (3) are taken relative to the value "1" which is achieved when the semiconductor laser 16 is continuously driven. As shown in FIG. 4, the peak output power of the semiconductor laser 16 increases as the pulse duration is reduced. When the pulse duration is shorter than about 10 μs, the input coupling efficiency progressively decreases as the pulse duration becomes shorter It is considered that this is caused by the transition of the oscillation mode of the semiconductor laser 16 from a basic mode to a higher-order mode. The wavelength conversion efficiency has its maximum value at a pulse duration Wp which is determined from both the peak output power and the input coupling efficiency. If the pulse duration is shorter than the value Wp, the wavelength conversion efficiency decreases as the pulse duration decreases. In the illustrated embodiment, the pulse duration Wp is about 0.5 μs. The duration of the pulses applied to the semiconductor laser 16 is selected to be 1 μs, as described above, which is close to 0.5 μs. According to the method of the present invention, the wavelength conversion efficiency is over 4 times greater than when the semiconductor laser 16 is continuously driven.

The pulsed second harmonic 15', which is generated when the semiconductor laser 16 is driven with pulses, may be applied to a photosensitive medium for recording an image thereon In such an application, it is important to apply a large amount of light energy to the photosensitive medium in a unit period of time. More specifically, when the semiconductor laser 16 is continuously driven, the beam output power thereof is about 40 mW, the wavelength conversion efficiency has a relative value of 1, and the duty ratio of the semiconductor laser 16 is 100%. When the semiconductor laser 16 is driven with pulses whose duration is 1 μs, the peak output power thereof is 100 mW or higher, the wavelength conversion efficiency has a relative value of 6 or more, and the duty ratio of the semiconductor laser 16 is 50%. The amount of light energy of the second harmonic 15' which is produced in a unit period of time when the semiconductor laser 16 is driven with pulses, is basically expressed by:

$$(100/40) - (4/1) \times (50/100) = 5$$

and thus is over 5 times greater than the amount of light energy which is generated when the semiconductor laser 16 is continuously driven. If the laser beam 15 is modulated under such conditions, no problem with noise will be caused when an image is recorded on the photosensitive medium since the speed at which the laser beam 15 is modulated is sufficiently higher than the speed at which the image is recorded on the photosensitive medium.

In the above embodiment, the duration of the pulses used to drive the semiconductor laser 16 is set to 1 μs, which is close to the value of the pulse duration Wp. However, the duration of the drive pulses may equal the pulse duration Wp. Alternatively, the duration of the drive pulses may be of any value insofar as it is greater than the pulse duration Wmin (FIG. 4) which falls within the range of pulse durations wherein the input coupling efficiency decreases as the pulse duration decreases and at which the wavelength conversion efficiency is equal to that which is achieved when the semiconductor laser 16 is continuously driven, and also insofar as it enables the semiconductor laser 16 to generate a higher peak output power than when the semiconductor laser 16 is continuously driven.

While the fiber-type optical wavelength converter device is employed in the illustrated embodiment, the method of the present invention is also applicable to an optical wavelength converter module which comprises an optical wavelength converter device in the form of a two- or three-dimensional optical waveguide. Such an optical wavelength converter module may have a grating coupler which is formed on the surface of a substrate and which diffracts and introduces a fundamental into the optical waveguide.

Moreover, although the pulsed drive current I and hence the laser beam 15 are rectangular waves in the above embodiment, they may also be square waves. However, it is preferable that the pulsed drive current I and hence the laser beam be rectangular waves in order for the light energy per unit time to be increased. The method of the present invention is also applicable to the generation of third harmonics or the like as well as to the generation of second harmonics. The method of the present invention is more effective if applied to the generation of third harmonics because the wavelength conversion efficiency is proportional to the cube of the intensity of the fundamental.

With the present invention, as described above, a semiconductor laser acting as the source of a fundamental is driven with pulses, and the duration of the pulses is made short enough to enable the semiconductor laser to produce a higher peak output power than when the semiconductor laser is continuously driven, and it is made longer than a duration which falls within the range of pulse durations wherein the input coupling efficiency decreases as the pulse duration decreases and at which the wavelength conversion efficiency is equal to that which is achieved when the semiconductor laser is continuously driven. Consequently, the intensity of the fundamental introduced into the optical wavelength converter device can be sufficiently increased, and the input coupling efficiency is prevented from being greatly lowered, with the result that a high wavelength conversion efficiency can be achieved. According to the present invention, therefore, a highly intensive wavelength-converted wave can be generated while the light energy is utilized with a sufficiently high efficiency.

Although a certain preferred embodiment has been shown and described, it should be understood that many changes and modifications may be made therein without departing from the scope of the appended claims.

We claim:

1. A method of driving an optical wavelength converter module including an optical wavelength converter device having a cladding and a waveguide which is disposed in the cladding and has a higher refractive index than the cladding, at least one of the cladding and the waveguide being made of a nonlinear optical material, whereby the wavelength of a fundamental wave of a laser beam which is propagating in the waveguide is converted, the optical wavelength converter module also including a semiconductor laser for emitting said laser beam which is introduced as said fundamental wave of said laser beam into the waveguide, said method comprising the steps of:

(i) driving the semiconductor laser with a pulsed drive current; and
   (ii) controlling a duration of said drive current pulses to enable a peak output power of the semiconductor laser to increase over that when the semiconductor laser is continuously driven, and controlling said duration of said drive current pulses to be longer than a duration within a range of pulse durations between which the input coupling efficiency decreases as the pulse duration decreases and the wavelength conversion efficiency is equal to that achieved when the semiconductor laser is continuously driven.

2. A method according to claim 1, wherein said duration of the drive current pulses is 1 $\mu$s.

3. A method according to claim 1, wherein said pulsed drive current is a rectangular wave.

4. A method according to claim 1, wherein said pulsed drive current is a square wave.

5. An apparatus for driving an optical wavelength converter module including an optical wavelength converter device having a cladding and a waveguide which is disposed in the cladding and has a higher refractive index than the cladding, at least one of the cladding and the waveguide being made of a nonlinear optical material, whereby the wavelength of a fundamental wave of a laser beam which is propagating in the waveguide is converted, said optical wavelength converter module also including a semiconductor laser for emitting said laser beam which is introduced as said fundamental wave of said laser beam into the waveguide, said apparatus comprising:

driving means for driving said semiconductor laser with a pulses drive current; and
   controlling means for controlling a duration of said drive current pulses to enable a peak output power of said semiconductor laser to increase over than when said semiconductor laser is continuously driven, and controlling said duration of drive current pulses to be longer than a duration within a range of pulse durations between which the input coupling efficiency decreases as the pulse duration decreases and a wavelength conversion efficiency is equal to that achieved when said semiconductor laser is continuously driven.

6. An apparatus according to claim 5, wherein said duration of said drive current pulses is one $\mu$s.

7. An apparatus according to claim 5, wherein said pulsed drive current is a rectangular wave.

8. An apparatus according to claim 5, wherein said pulsed drive current is a square wave.

* * * * *